United States Patent [19]
Klippel

[11] Patent Number: 5,277,469
[45] Date of Patent: Jan. 11, 1994

[54] MOTOR VEHICLE DOOR REINFORCEMENT TUBE AND A PROCESS FOR MANUFACTURING THE REINFORCEMENT TUBE

[75] Inventor: Horst Klippel, Ratingen, Fed. Rep. of Germany

[73] Assignee: Mannesmann Aktiengesellschaft, Düsseldorf, Fed. Rep. of Germany

[21] Appl. No.: 827,741

[22] Filed: Jan. 29, 1992

Related U.S. Application Data

[62] Division of Ser. No. 604,058, Oct. 26, 1990, Pat. No. 5,093,990.

[30] Foreign Application Priority Data

Oct. 26, 1989 [DE] Fed. Rep. of Germany ....... 3935964
Oct. 15, 1990 [DE] Fed. Rep. of Germany ....... 4032992

[51] Int. Cl.⁵ .............................................. B60J 5/04
[52] U.S. Cl. ...................... 296/146.6; 49/502; 52/731.6
[58] Field of Search ............ 296/146C, 188, 189, 205; 52/731; 49/502; 256/13.1

[56] References Cited

U.S. PATENT DOCUMENTS

| | | | |
|---|---|---|---|
| 1,882,352 | 10/1932 | Woodhead et al. | 29/897.2 |
| 3,075,484 | 1/1963 | Benteler | 228/158 |
| 3,520,165 | 7/1970 | Dodson | 72/368 X |
| 3,718,364 | 2/1973 | Fischer et al. | 296/146 C X |
| 3,829,149 | 8/1974 | Stevens | 267/140 |
| 3,868,141 | 2/1975 | Johnson | 296/146 C X |
| 3,938,288 | 2/1976 | Roubinet | 52/309.8 |
| 4,090,734 | 5/1978 | Inami et al. | 296/146 |
| 4,281,487 | 8/1981 | Koller | 52/731 X |
| 4,289,301 | 9/1981 | Akabame et al. | 256/13.1 |
| 4,599,843 | 7/1986 | Ingvarsson | 52/731 X |
| 4,708,390 | 11/1987 | Palentyn et al. | 296/188 |
| 4,842,051 | 6/1989 | Brownlee | 52/731 X |
| 4,861,097 | 8/1989 | Wycech | 296/188 |
| 4,866,883 | 9/1989 | Brown et al. | 49/502 |
| 4,919,473 | 4/1990 | Laimighofer | 296/146 C X |
| 4,978,562 | 12/1990 | Wycech | 428/35.8 |

FOREIGN PATENT DOCUMENTS

| | | |
|---|---|---|
| 2215674 | 5/1973 | Fed. Rep. of Germany . |
| 3021482 | 12/1981 | Fed. Rep. of Germany . |
| 8313061 | 2/1984 | Fed. Rep. of Germany . |
| 3606024 | 3/1987 | Fed. Rep. of Germany . |
| 3610481 | 10/1987 | Fed. Rep. of Germany . |
| 0047615 | 2/1989 | Japan .................. 296/188 |
| 2056330 | 3/1981 | United Kingdom . |

Primary Examiner—Dennis H. Pedder
Attorney, Agent, or Firm—Nils H. Ljungman & Associates

[57] ABSTRACT

A reinforcement tube having high strength, toughness and resilience for use as an absorption element in a motor vehicle door, the reinforcement tube having a cross-section in which a first dimension of the cross-section is greater than a second dimension of the cross-section, the second dimension being perpendicular to the first dimension.

20 Claims, 5 Drawing Sheets

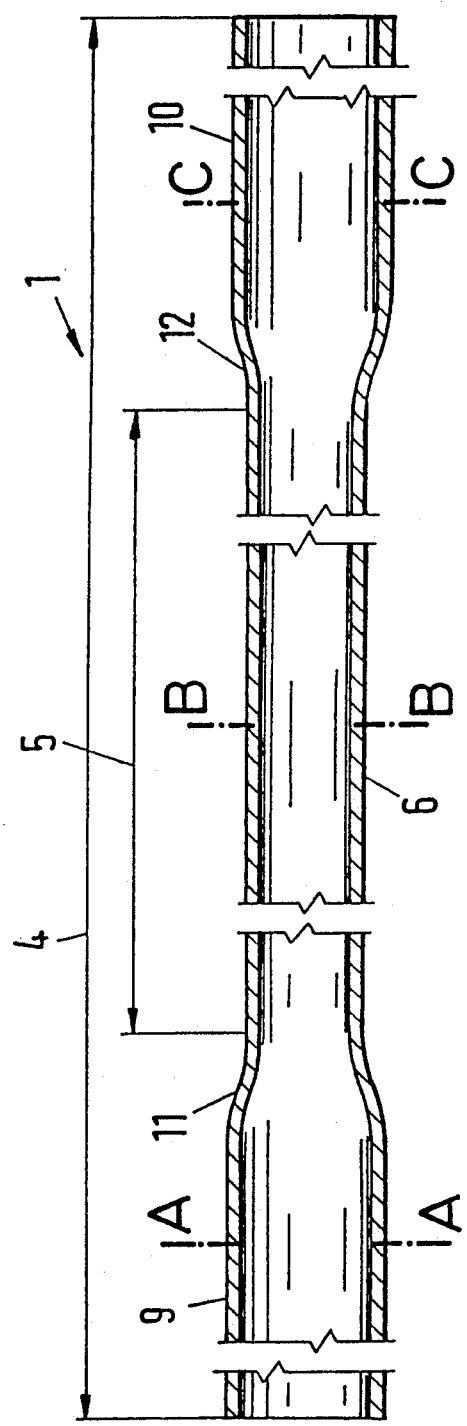
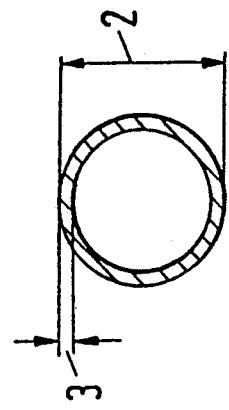
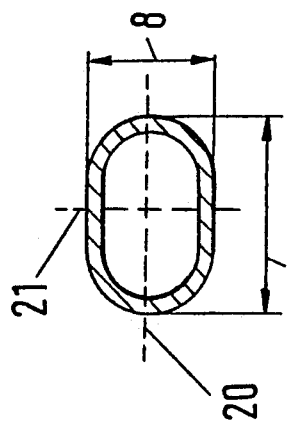
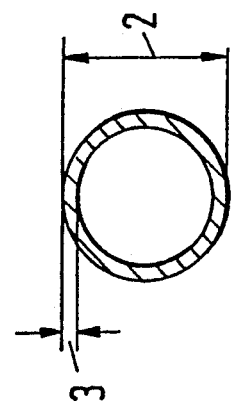

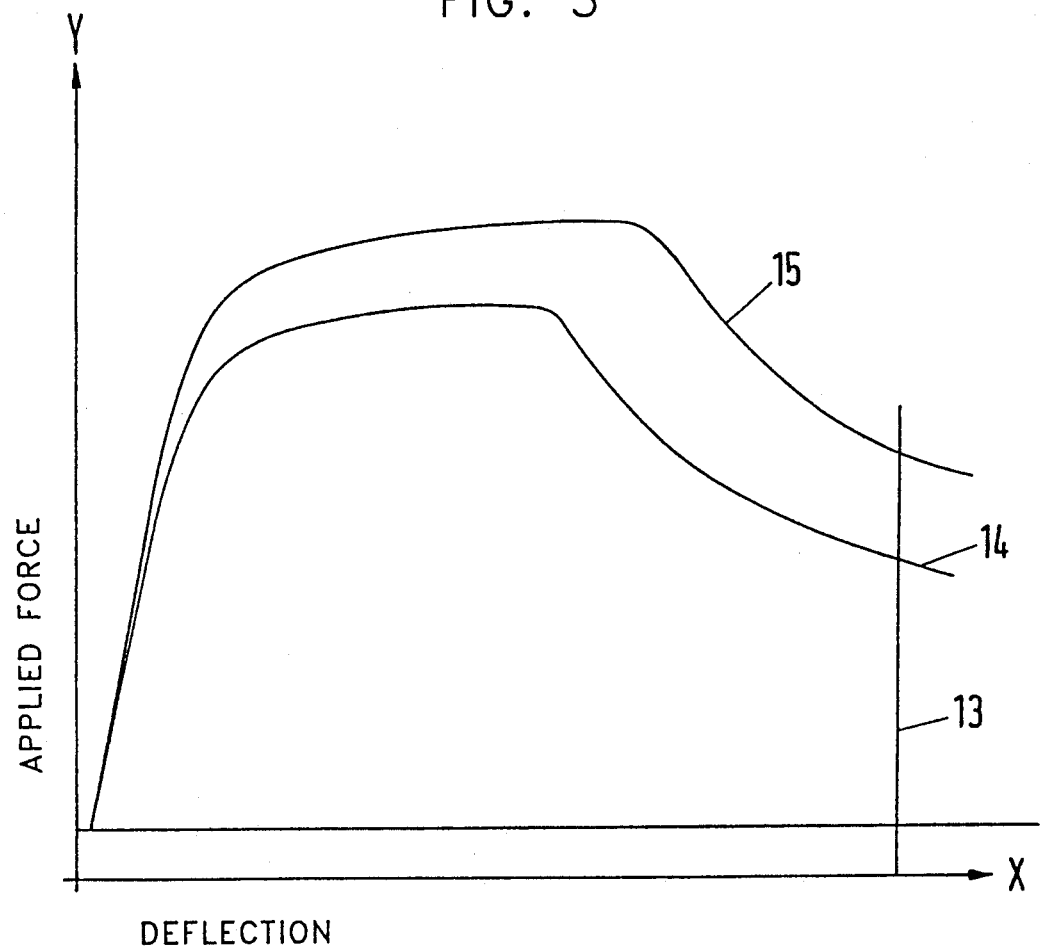

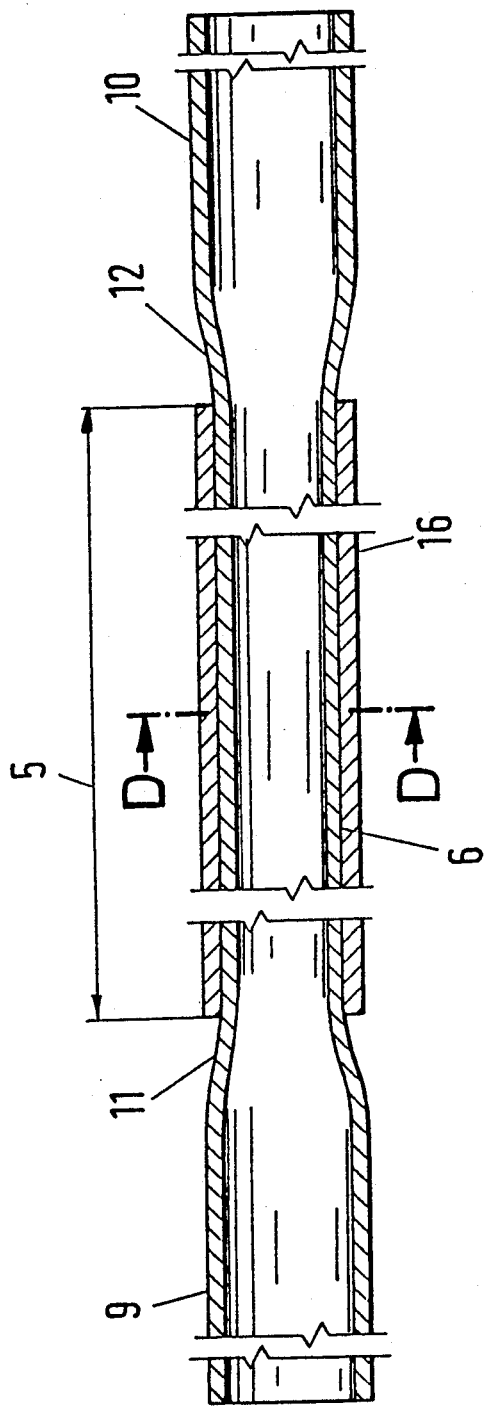
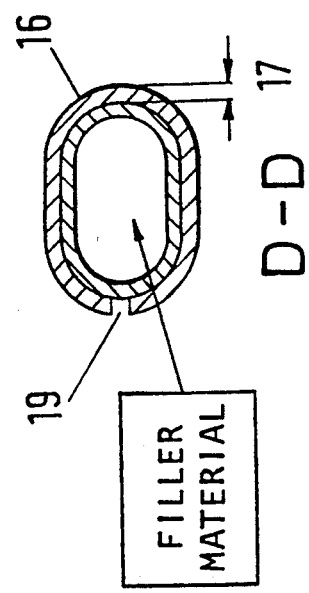
FIG. 4
FIG. 4A D-D

MOTOR VEHICLE DOOR REINFORCEMENT TUBE AND A PROCESS FOR MANUFACTURING THE REINFORCEMENT TUBE

This is a divisional application of Ser. No. 07/604,058, filed on Oct. 26, 1990, now U.S. Pat. No. 5,093,990.

BACKGROUND OF THE INVENTION

1. Field of the Invention

This invention relates to a motor vehicle door reinforcement tube having high strength, toughness and resilience for use as an impact absorption element for a motor vehicle door, in particular the door of a passenger car.

2. Background Information

These door reinforcement tubes are used as braces in motor vehicle doors to absorb the impact energy in lateral collisions and convert the impact energy into mechanical work, with the intent being to ensure the integrity of the door structure. For such a door reinforcement tube to perform this safety function, the tube must possess the following characteristics, for example:

| Tensile strength | Rm | min. | 1100 N/mm2 |
|---|---|---|---|
| Limit of elasticity | Rt | min | 800 N/mm2 |
| Elongation at failure | A5 | min. | 8% | or a W-150 energy absorption of at least 1900 Joule, as a function of the profile dimensions.

These minimum requirements can be higher or lower, as specified by the automobile manufacturer.

The energy absorption is tested by deflecting a door reinforcement tube 150 mm in a 3-point bending test. The force applied is recorded over the deflection and the surface area below the curve is determined. This integral then gives the desired energy absorption characteristic.

In automobile construction, in addition to many special developments, two basic problems are constantly being addressed: the reduction of the vehicle weight, and an increase in the passive safety provided to the seated passengers.

One proposed solution for these problems is disclosed in German Patent No. 37 28 476, in which, through the use of a particular steel alloy, the tensile strength and limit of elasticity values of a door reinforcement tube are increased compared to the prior art. One disadvantage of this proposal is that the reinforcing effect is achieved only by the addition of relatively expensive elements such as nickel and molybdenum.

According to another proposal, German Patent No. 36 06 024, a protective element made of light alloy is used to reinforce the vehicle door at both ends of the vehicle door. This nearly square reinforcement element is not intended for narrow vehicle doors with a low insertion depth, and is designed with thick walls to compensate for low strength values, which means that the advantage of the lower specific weight of the light alloy is largely eliminated. Moreover, this reinforcement element is not very adaptable to different vehicle doors, as different doors may require different dimensions. Also, for each reinforcement element that is needed, a new extrusion die needs to be created, which extrusion die is expensive to make.

OBJECT OF THE INVENTION

The object of the present invention is to provide a tubular steel reinforcement element which uses an economical steel alloy and which reinforcement element can be manufactured with the conventional production equipment which is used for the manufacturing of round tubes.

SUMMARY OF THE INVENTION

The tubular steel reinforcement element of this invention has the required mechanical characteristics, is lightweight, and is also suitable for installation even in narrow vehicle doors.

This object is achieved by forming the reinforcement tube so that at least a portion of the tube has a non-circular cross-section such that the longer axis is at least 20% longer than the shorter axis which is perpendicular to the longer axis. Advantageous refinements and a process for the manufacture of such a profile are also disclosed.

The proposed tubular steel reinforcement element utilizes the knowledge that the energy absorption ability is a function of, among other things, the magnitude of the section modulus of the structural part. Since the section modulus is a function only of the structural configuration, the tubular steel profile according to the invention has a segment extending longitudinally with a curved exterior contour and a cross-section which is not circular, whose longer axis is at least 20% longer than the shorter axis perpendicular to it. So that the higher section modulus, which is in the longer axis, can be fully utilized when the reinforcement tube is installed in the vehicle door, the longer axis of the steel profile cross-section is parallel to the direction of the impact. The deformed cross-section is preferably elliptical or oval, and can extend over the entire length of the steel reinforcement element or only over a central area.

The shaping of the circular cross-section into an elliptical or oval cross-section is done by cold pressing a primary tube which has a round cross-section after the tube is first hardened. The material in the deformed segment is thereby cold work hardened, whereby the cold work hardening also contributes to increasing the energy absorption capability of the tube. The degree of shape deformation should be at least 15%. The original tube with a circular cross-section can be either a seamless or welded tube, whereby conventional tube production processes such as hot rolling or welding (e.g. HF process) can be used in the tube formation. The required strength and limit of elasticity are generally achieved by means of an annealing with a subsequent quenching in water, oil, or air. Alternatively, a material can be used which makes possible the hardening of the steel tube directly from the rolling heat, without a separate and subsequent heat treatment. The increase of the resilience by utilizing a higher section modulus with a simultaneous cold work hardening of the deformed segment can be used to reduce the wall thickness and/or the diameter of the steel tube accordingly, thereby saving weight. Alternatively, the increase can also be used to provide the tubular, hardened steel reinforcement element with corrosion protection by means of a subsequent hot dip galvanizing, without running the risk that the mechanical values, which are reduced by the tempering effect of the galvanizing, will drop below the specified minimum values.

In addition to an elliptical or oval cross-section, other non-circular cross sections can also be used (e.g. a rectangular cross-section). But all cross sections having corners are more difficult to manufacture than oval or elliptical cross-sections. The manufacture of the elliptical cross-section is theoretically simple, since all that is necessary is to place the original circular tube under a press and to shape segments of the tube, or the entire tube to the desired cross-section by means of flat plates or with appropriately shaped dies. Alternatively, steel profiles having an oval cross-section can also be manufactured directly by a hot rolling process. The transport of such oval reinforcement elements in the finishing shop is difficult, however, since the tubes cannot simply be rolled from one place to another. The straightening of such tubes, primarily when they have been hardened, while theoretically possible, is very difficult to perform. The straightening machines which are required are also very complex and expensive to design and procure, and can only be used for specific diameters. For major dimensional changes, the set of straightening rollers must always be completely replaced. For this reason, this alternative process of shaping the steel profiles having an oval cross-section is no longer used.

The effect of an increase of the resilience can only be utilized if the segment having a non-circular cross-section extends over a certain length in proportion to the total length. Therefore, the minimum length of this segment should be 25% of the total length. Likewise, it is necessary for the ratio of the major axis to the minor axis of the cross-section to exceed a certain specified value, so that the deformation from the circular shape is significant. Therefore, this ratio should be at least 1.20, and for an elliptical cross-section, a value of 1.25 is preferred.

It is also proposed that the segment be formed so that the cross-section in the center of the steel reinforcement element has the highest ratio of major to minor axis, and that this ratio decreases to 1 toward both ends of the tube (the ratio of 1 corresponding to a circular shape). This would be appropriate for a segment extending over the entire length of the tubular steel reinforcement element as well, since the central area makes the largest contribution to the level of the energy absorption ability.

According to known mathematical formulas for the relationship between the deflection line and the section modulus, a stronger tube can be obtained by one refinement of the invention which proposes a reinforcement for the central region. This reinforcement consists of a cylindrical metal sleeve, which, before the cold pressing into an elliptical or oval cross-section, is pushed onto or into the tubular steel profile as an outer or inner tube, respectively. To fix the position of this reinforcing sleeve, the sleeve can be provided with an adhesive, for example, or the sleeve can be connected to the tubular steel profile by welding or soldering. Another type of fixing is possible if a slit sleeve is used, the dimensions of which are selected so that a clamping action is produced. A clamping action can also be achieved with a closed sleeve, if care is taken that, in the case of an inner sleeve, it has a thinner wall, and in the case of an outer sleeve, it has a thicker wall than the steel profile.

Another alternative to the addition of a reinforcing sleeve, in another refinement of the invention, is that the segment with the oval or elliptical cross-section has a wall which is thicker than the wall of the adjacent regions. This has the advantage that the transition from the thickened region to the adjacent regions is continuous, thereby creating no attachment problems. Such a thickening over a specified length, regardless of whether the thickening extends radially outward or inward, or is uniformly distributed both outward and inward, can be produced by means of various manufacturing methods. One of the possibilities, for example, is drawing with a tapered mandrel (German Patent No. 30 21 482) or chipless shaping such as pressing, rolling or hammering (German Patent No. 36 10 481). The advantage of integral thickening compared to the sleeves pushed over or inserted into the tube is that the reinforcement can be directed more toward the outside or more toward the inside, as appropriate, with regard to the desired exterior dimensions, the weight of the component and the size of the load-bearing cross-section. Alternatively, instead of using either a sleeve, or an increased wall portion, both a sleeve and a thickened wall portion could be used conjunctively.

To reduce the risk of buckling of the tubular steel reinforcement element in case of impact, and/or to displace the occurrence of buckling until after the specified 150 mm deflection has been reached, the invention also proposes that the interior of the central segment be filled with a medium which has a low specific gravity. Material mixtures for such reinforcement foams are disclosed, for example, in U.S. Pat. No. 4,861,097. Alternatively, metal foams or wood can also be used.

The advantage of the proposed tubular steel reinforcement element is that by increasing the section modulus and by means of the thorough cold work hardening of the shaped segment when it is deformed into an oval or elliptical cross-section, the weight of the reinforcement element is simply and economically reduced. Moreover, the invention can use a simply and economically manufactured round tube from existing production lines as the original tube used for the making of the tube of the present invention.

One aspect of the invention resides broadly in a door for a motor vehicle, the door comprising: a framework having an inner side, an outer side and a peripheral edge; an inner panel secured to the inner side of the framework; an outer panel secured to the outer side of the framework; releasable locking apparatus disposed on the framework for retaining the door in a closed position; sealing device secured to the peripheral edge; the sealing device being for providing a seal between the door and the motor vehicle when the door is in its closed position; hinges disposed on the framework for hingedly attaching the door to the motor vehicle for movement of the door away from the motor vehicle to an open position and towards the motor vehicle to a closed position; at least one reinforcement element secured to at least one of the framework, the outer panel and the inner panel; the at least one reinforcement element being disposed for providing protection against collisions to the door of the motor vehicle; the at least one reinforcement element having: a first end, a second end, and a center portion disposed between the first end and the second end; a length; a cross-sectional area defining a first axis and a second axis substantially perpendicular to the first axis; and a dimension of the cross-sectional area taken along the first axis of at least a portion of the reinforcement tube having a length greater than a length of a dimension of the cross-sectional area taken along the second axis of the at least a portion of the reinforcement tube.

Another aspect of the invention resides broadly in a tubular steel reinforcement element for a motor vehicle door, the tubular steel reinforcement element having: a first end, a second end, and a central portion disposed between the first end and the second end; a length; a cross-sectional area, the cross-sectional area defining a first axis and a second axis substantially perpendicular to the first axis; and a dimension of the cross-sectional area taken along the first axis of at least a portion of the reinforcement tube having a length greater than a length of a dimension of the cross-sectional area taken along the second axis of the at least a portion of the reinforcement tube.

Yet another aspect of the invention resides broadly in a process for the manufacture of a tubular reinforcement element for a motor vehicle door, the reinforcement element having high strength, toughness and resilience, and the process comprising the steps of: hardening a steel tube, the steel tube having a cross-sectional area, and the cross-sectional area defining a first axis and a second axis substantially perpendicular to the first axis; and compressing at least a portion of the tube so that a dimension of the cross-section taken along the first axis of the at least a portion of the tube is longer than a dimension of the cross-section taken along the second axis of the at least a portion of the tube.

The tubular steel reinforcement element is explained in greater detail with reference to the following drawings.

BRIEF DESCRIPTION OF THE DRAWINGS

FIG. 2 shows a longitudinal section through a tubular steel reinforcement element according to the invention, with three corresponding cross sections along lines A—A, B—B and C—C.

FIG. 2A shows a cross-sectional view through the tube of FIG. 2 taken along line A—A.

FIG. 2B shows a cross-sectional view through the tube of FIG. 2 taken along line B—B.

FIG. 2C shows a cross-sectional view through the tube of FIG. 2 taken along line C—C.

FIG. 3 shows a graph of the energy absorption capability of a tubular steel reinforcement element according to the invention compared to a standard tube.

FIG. 4 shows a longitudinal section through a centrally-reinforced reinforcement tube with a corresponding cross-section along line D—D.

FIG. 4A shows a cross-sectional view through the tube of FIG. 4 taken along line D—D.

DESCRIPTION OF THE PREFERRED EMBODIMENTS

Figure 1:
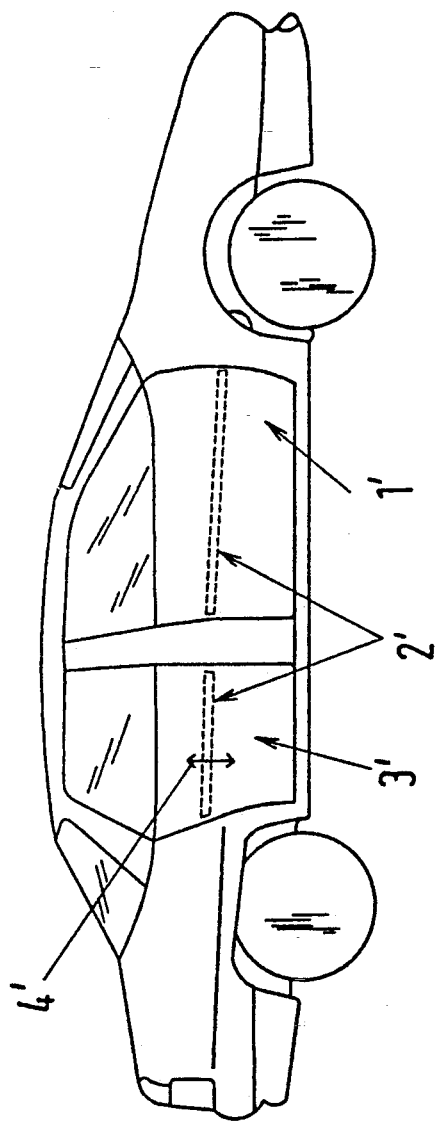
FIG. 1 shows an automobile having a door reinforced with a tubular reinforcement element.

FIG. 1 depicts an automobile with doors 1', 3' which have reinforcement tubes 2' secured inside the doors to provide reinforcement to the door for protection upon a lateral collision by another vehicle.

FIG. 2 shows portions of a longitudinal cross-section of the tubular steel reinforcement element according to the invention, and located directly beneath it, FIGS. 2A, 2B, and 2C, show three corresponding cross sections of the tubular steel reinforcement element 1 along lines A—A, B—B and C—C of FIG. 2. The original tube illustrated here by way of example has the following dimensions after hardening: outside diameter 31.8 mm (2), wall thickness 2.3 mm (3), total length 864 mm (4).

For purposes of illustration, in this tubular steel reinforcement element 1, a segment 6 in the central area, extending over a length 5 of 250 mm, has been cold-formed with an oval cross-section B—B. Here, the length 7 of major axis 20 of this oval cross-section B—B is, for example, 37.0 mm and the length 8 of minor axis 21 is 25.4 mm. The ratio of the major to minor axis of the oval cross-section B—B is therefore 1.45, which corresponds to a deformation of 20%. The proportion of the length 5 of the deformed segment 6 in relation to the total length 4 of the door reinforcement tube 1 here is 20% and can be greater than 25% if desired. The two areas 9, 10 adjacent to the deformed segment 6 have an unchanged circular cross-section, characterized by the cross sections A—A and C—C. The transitions 11, 12 from the deformed segment 6 to the undeformed segments 9, 10 are smoothly rounded, so that no notch effects occur which would significantly reduce the energy absorption capability. Within the car door of FIG. 1, the minor axis 21 of the reinforcement element 1 can be aligned in the direction of the arrow 4', or in alignment with the top and bottom of the door.

The material used for the example is a commercially available carbon-manganese-titanium boron steel with the following composition in percent by weight: $C=0.19$, $Si=0.42$, $Mn=1.19$, $P=0.012$, $S=0.001$, $Al=0.049$, $Cu=0.2$, $Cr=0.3$, $Ni=0.03$, $Mo=0.01$, $Ti=0.054$, $B=0.0037$ and $N=0.0147$, with the rest being iron and the customary impurities. With regard to the energy absorption capability, the requirement is at least 1900 Joule. The tube produced from this material by hot rolling was annealed after rolling and quenched with water.

FIG. 3 is a graph which shows the force applied (Y-axis) over the deflection (X-axis), whereby the end line 13 marks the deflection of 150 mm specified by a test specification. The area beneath the curve is the desired energy absorption capability. Curve 14 is the force-deflection curve of a tubular steel reinforcement element having a circular cross-section extending over the entire length with an outside diameter of 31.8 mm and a wall thickness of 2.3 mm. The area beneath the curve gives a value of 2628 Joule. For purposes of comparison, Curve 15 shows the force-deflection curve of the tubular steel reinforcement element 1 according to the invention, with a segment 6 which has an oval cross-section B—B and extends over a length 5 of 250 mm. The energy absorption capability in this case is 3288 Joule, which corresponds to a 25% increase, which can be utilized for a corresponding reduction of wall thickness, diameter and thus weight.

FIGS. 4 and 4a show portions of a longitudinal cross-section and a corresponding cross-section along line D—D of another embodiment, whereby the same reference numbers are used for the same parts. The central region 6 of the tubular steel reinforcement element is reinforced by way of example with an outer sleeve 16, which is pushed over the original tube before the cold forming and which is held in place, for example, by adhesives. Since the outer sleeve 16 can be fabricated independently of the original tube, the wall thickness 17 can vary to achieve an optimum with regard to the resistance increase and the weight of the reinforcement element.

Figure 5:
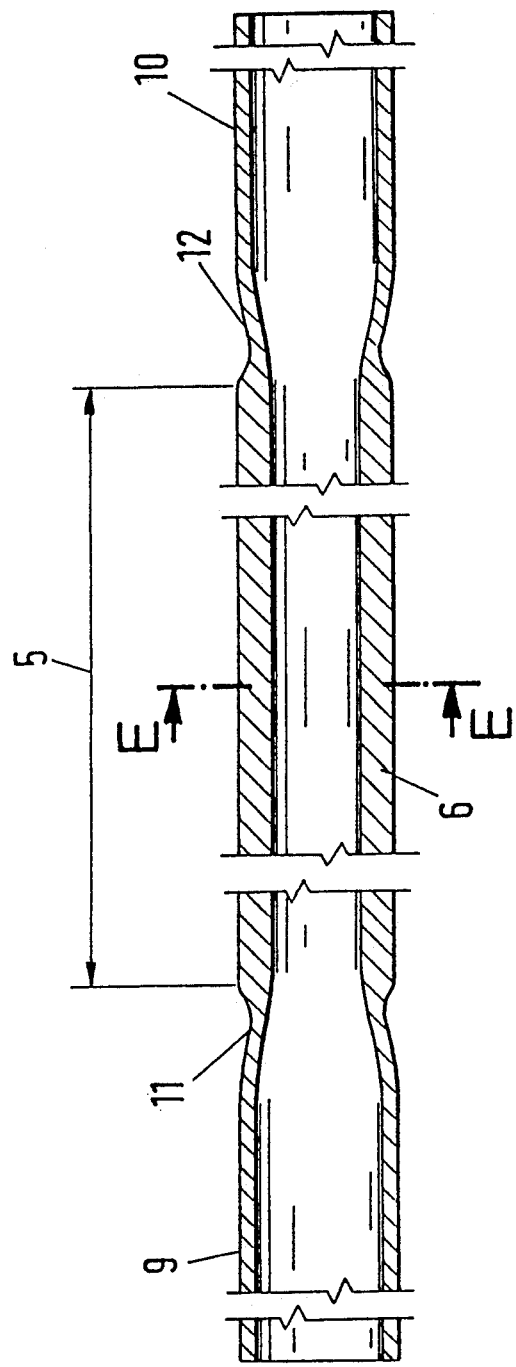
FIG. 5 shows a longitudinal section through an integrated centrally-reinforced reinforcement tube with a corresponding cross-section along line E—E.
Figure 5A:
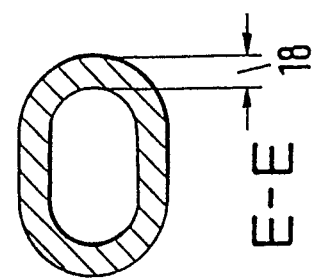
FIG. 5A shows a cross-sectional view through the tube of FIG. 5 taken along line E—E.

FIGS. 5 and 5a show portions of a longitudinal cross-section and a corresponding cross-section along line E—E of another embodiment, whereby the same reference numbers are used for the same parts. The central region 6, in contrast to the embodiment illustrated in FIG. 4, is not reinforced by an outer sleeve 16, but in an integrated manner by means of a thicker wall 18. In this embodiment, the thicker wall 18 can be shifted radially outward, or likewise radially inward, or can be uniformly distributed outward and inward. Before the subsequent cold forming of the segment 6 with its reinforced wall thickness to produce an oval or elliptical cross-section, the tubular steel reinforcement element is first formed to achieve a thicker/thinner wall and is then heat-treated. The size of the thickened wall 18 and the radial position of the thicker portion can be optimized in terms of weight and the desired section modulus.

In summary, one feature of the invention resides broadly in a tubular steel reinforcement element having high strength, toughness and resilience as an impact absorption element for reinforcing the door of a motor vehicle, in particular of a passenger car that is characterized by the fact that the tubular steel reinforcement element (1) has a segment (6) extending longitudinally which has a non-circular cross-section and a curved exterior contour, the longer axis of which is at least 20% longer than the shorter axis which is perpendicular to it.

Another feature of the invention resides broadly in a tubular steel reinforcement element that is characterized by the fact that the segment (6) extends over the entire length (4) of the tubular steel reinforcement element (1).

Yet another feature of the invention resides broadly in a tubular steel reinforcement element that is characterized by the fact that the segment (6) extends over a specified length (5) in the central region of the tubular steel reinforcement element (1).

A further feature of the invention resides broadly in a tubular steel reinforcement element that is characterized by the fact that the cross-section is designed as an ellipse.

A yet further feature of the invention resides broadly in a tubular steel reinforcement element that is characterized by the fact that the ratio of the major axis to the minor axis of the ellipse is at least 1.25.

Yet another feature of the invention resides broadly in a tubular steel reinforcement element that is characterized by the fact that the cross-section is designed as an oval.

An additional feature of the invention resides broadly in a tubular steel reinforcement element characterized by the fact that the length of segment (6) is at least 25% of the total length (4).

A yet additional feature of the invention resides broadly in a tubular steel reinforcement element that is characterized by the fact that in the center of the formed segment, the ratio of major to minor axis is the greatest, and decreases to the value 1 at both ends.

A further additional feature of the invention resides broadly in a tubular steel reinforcement element that is characterized by the fact that the segment (6) has a reinforcement which is connected as an external (16) and/or internal sleeve to the tubular steel reinforcement element.

A yet further additional feature of the invention resides broadly in a tubular steel reinforcement element that is characterized by the fact that the segment (6) has a reinforcement which as a slit outer and/or inner sleeve is connected to the tubular steel reinforcement element, whereby the slit (19) faces the inside of the motor vehicle.

Another further additional feature of the invention resides broadly in a tubular steel reinforcement element that is characterized by the fact that the segment (6) has a thicker wall than the adjacent sections (9, 10) and makes a rounded transition to these sections.

A yet another additional feature of the invention resides broadly in a tubular steel reinforcement element that is characterized by the fact that the inside of the segment (6) is filled with a medium having a low specific gravity.

Another yet further feature of the invention resides broadly in a process for the manufacture of a tubular steel reinforcement element having high strength, toughness and resilience in which an original tube is hardened and then cut into lengths, the process being characterized by the fact that after the hardening, a segment extending along the length of the tubular steel reinforcement element is cold-pressed.

A still further feature of the invention resides broadly in a process for the manufacture of a tubular steel reinforcement element having high strength, toughness and resilience in which an original tube is hardened and then cut into lengths, the process being characterized by the fact that after the hardening or cutting, a reinforcing metal sleeve is pushed onto or into the tubular steel reinforcement element, and then this thicker-walled region is cold-pressed.

A still further additional feature of the invention resides broadly in a process for the manufacture of a tubular steel reinforcement element having high strength, toughness and resilience in which an original tube is shape hardened and then cut into lengths, the process being characterized by the fact that the tubular steel reinforcement element is shaped by sections to a thicker/thinner wall, and the thicker-walled segment is cold-pressed after hardening.

Another still further additional feature of the invention resides broadly in a process characterized by the fact that the shaping is performed without any support.

Yet another still further additional feature of the invention resides broadly in a process characterized by the fact that the shaping is performed in a steel die.

Still another yet further additional feature of the invention resides in a process that is characterized by the fact that the degree of shaping is at least 15%.

Art hereby incorporated as reference includes German Patents No. 37 28 476 C1; No. 27 50 867 A1; No. 2,426,705; No. 1,962,279; 2,319,124; and 1,959,988 and U.S. Pat. Nos. 3,263,387 to Simpson; 3,868,796, to Bush; 3,938,288 to Roubinet, 3,964,208 to Renner, 4,017,117 to Eggert, Jr., 4,090,734 to Inami, et al., and 4,564,232 to Fujimori, et al.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A door for a motor vehicle, said door comprising:
   at least one reinforcement element disposed within the door;
   said at least one reinforcement element being disposed within the door to provide protection against collisions to the door of the motor vehicle;
   said at least one reinforcement element having:
   a first end, a second end, and a central portion disposed between the first end and the second end;
   a length from said first end to said second end;
   a cross-sectional area, the cross-sectional area defining a first axis and a second axis substantially perpendicular to the first axis;
   the cross-sectional area has a first dimension taken along the first axis and a second dimension taken along the second axis;
   the first dimension of the central portion being greater than the second dimension of the central portion;
   the cross-sectional area of the central portion of said reinforcement element defines an oval;
   a ratio between the first dimension taken along the first axis and the second dimension taken along the second axis is at least 1.25 in the central portion;
   the ratio is greatest in the central portion;
   the ratio decreases from the central portion to the first end and from the central portion to the second end; and
   the ratio decreases to about 1 at the first end and the second end;
   said at least one reinforcement element comprises a tube;
   said tube having a peripheral wall, the peripheral wall having a thickness;
   said cross-sectional area, said ratio, said length and said thickness being configured to absorb impact energy of collisions to the door; and
   said first dimension of said reinforcement element being disposed within said door in a lateral direction to absorb the impact energy of collisions to the door.

2. The door for a motor vehicle according to claim 1, wherein the central portion of said reinforcement element comprises at least 25% of the length of said reinforcement element.

3. The door for a motor vehicle according to claim 2, wherein the wall of the reinforcement tube has an exterior surface and an interior surface, and said reinforcement element further includes:
   means for adding additional strength to at least the central portion of said reinforcement element;
   said means for adding additional strength comprising at least one of:
   a thickening of the wall of the reinforcement element along at least the central portion of said reinforcement element; and
   a sleeve means fastened to at least one of:
   the exterior surface of at least the central portion of said reinforcement element; and
   the interior surface of at least the central portion of said reinforcement element.

4. The door for a motor vehicle according to claim 3, wherein said sleeve has a length, and said sleeve has a slit along the sleeve length.

5. The door for a motor vehicle according to claim 1, wherein the motor vehicle has a front, a rear, a top and a bottom, and the door further comprises:
   a front edge for being disposed toward the front of the motor vehicle and a rear edge for being disposed toward the rear of the motor vehicle;
   a top portion for being disposed toward the top of the motor vehicle and a bottom portion for being disposed toward the bottom of the motor vehicle; and
   said at least one reinforcement element being disposed in said door with the first end of said at least one reinforcement element disposed towards the front edge of said door, the second end of said at least one reinforcement element disposed towards the rear edge of said door, and the second axis of said at least one reinforcement element disposed substantially in a direction extending from the top of the vehicle door to the bottom of the vehicle door.

6. The door according to claim 5, wherein:
   the central portion of said reinforcement element has a length, the length of the central portion comprises at least 25% of the length of said reinforcement element;
   the door has a length extending from the front edge of the door to the rear edge of the door; and
   the length of the reinforcement element substantially comprises the length of the door.

7. The door according to claim 6, wherein said oval central portion of said at least one reinforcement element comprises:
   a first wall part and a second wall part, said second wall part being disposed spaced apart from said first wall part and each of said first wall part and said second wall part being substantially flat;
   a third wall part and a fourth wall part, said third wall part being disposed spaced apart from said fourth wall part;
   each of said third wall part and said fourth wall part being disposed between and connecting said first wall part to said second wall part; and
   said third wall part and said fourth wall part being substantially semi-circular and curved outwardly away from each other.

8. The door according to claim 7, wherein:
   said cross-sectional area, said ratio, said thickness and said length of said at least one reinforcement element being configured to absorb impact energy of at least 1900 Joules;
   said wall thickness is 2.3 millimeters;
   said length of said reinforcement element is 864 millimeters;
   said length of the central portion is 250 millimeters;
   said first dimension is 37 millimeters; and
   said second dimension is 25.4 millimeters.

9. A tubular steel reinforcement element for a motor vehicle door, said tubular steel reinforcement element having:
   a first end, a second end, and a central portion disposed between the first end and the second end;
   a length;

a cross-sectional area, the cross-sectional area defining a first axis and a second axis substantially perpendicular to the first axis;

the cross-sectional area having a first dimension taken along the first axis and a second dimension taken along the second axis;

the first dimension of the central portion being greater than the second dimension of the central portion;

the first dimension taken along the first axis of the cross-section of the central portion is at least 20% greater than the second dimension taken along the second axis of the cross-section of the central portion;

a ratio between the first dimension and the second dimension is greatest in the central portion;

the ratio decreases from the central portion to the first end and from the central portion to the second end;

the ratio decreases to about 1 at each of the first end and the second end;

said reinforcement element being disposed within a door with said first dimension of said reinforcement element disposed in a lateral direction to absorb impact energy of collisions to the door; and said cross-sectional area, said ratio and said length being configured to absorb an impact energy of collisions to the door of at least 1900 Joules in said lateral direction along said first dimension.

10. The reinforcement element according to claim 9, wherein the cross-sectional area of the central portion defines an oval;

the ratio between the first dimension taken along the first axis of the central portion and the second dimension taken along the second axis of the central portion is at least 1.25;

the central portion of said reinforcement element comprises at least 25% of the length of said reinforcement element;

said tubular reinforcement element having a peripheral wall, the peripheral wall having a thickness; and said cross-sectional area, said ratio, said thickness and said length of said at least one reinforcement element being configured to absorb impact energy of collisions to the door of at least 1900 Joules.

11. The reinforcement element according to claim 10, further including:

a means for adding additional strength to at least the central portion of said reinforcement element;

said means for adding additional strength comprising at least one of:

a thickening of a wall of the reinforcement element along at least the central portion of said reinforcement element; and a sleeve means fastened to at least one of:

an exterior surface of at least the central portion of said reinforcement element; and an interior surface of at least the central portion of said reinforcement element.

12. The reinforcement element according to claim 11, wherein said sleeve has a length, and said sleeve has a slit along the sleeve length.

13. The reinforcement element according to claim 11, wherein at least a portion of said reinforcement element is filled with a substance which has a low specific gravity, said substance comprising at least one member of the group consisting essentially of: foam and wood.

14. The reinforcement tube according to claim 11, wherein said ratio of said first dimension to said second dimension is 1.45 in the central portion.

15. The reinforcement element according to claim 14, wherein said central portion of said at least one reinforcement element comprises:

a first wall part and a second wall part, said second wall part being disposed spaced apart from said first wall part and each of said first wall part and said second wall part being substantially flat;

a third wall part and a fourth wall part, said third wall part being disposed spaced apart from said fourth wall part;

each of said third wall part and said fourth wall part being disposed between and connecting said first wall part to said second wall part; and said third wall part and said fourth wall part being substantially semi-circular and curved outwardly away from each other.

16. A reinforcement element for reinforcing a motor vehicle door, said reinforcement element having a first end, a second end, a central portion disposed between the first end and the second end, and a length from the first end to the second end, said reinforcement element comprising:

a cross-sectional area, the cross-sectional area defining a first axis and a second axis substantially perpendicular to the first axis;

the cross-sectional area of the first end, the second end and the central portion each have a first dimension taken along the first axis and a second dimension taken along the second axis;

each of the first end, the second end and the central portion comprise a ratio of said first dimension to said second dimension;

the ratio of the first dimension to the second dimension is greatest in the central portion, the ratio in the central portion being substantially greater than 1;

the ratio of the first dimension to the second dimension decreases from the central portion to each of the first end and the second end;

said reinforcement element being disposed within the door with said first dimension of said reinforcement element disposed in a lateral direction to absorb impact energy of collisions to the door; and said cross-sectional area, said ratio and said length being configured to absorb impact energy of collisions to the door.

17. The reinforcement element according to claim 16, wherein:

the cross-sectional area of the central portion defines an oval and the ratio of the first dimension to the second dimension in the central portion is greater than 1.2;

the cross-sectional area of each of the first end and the second end essentially define a circle and the ratio of the first dimension to the second dimension in each of said first end and said second end is about 1; and the central portion comprises at least 25% of the length of said reinforcement element.

18. The reinforcement element according to claim 17, wherein:

the ratio of the first dimension to the second dimension in the central portion is at least 1.25;

said reinforcement element comprises a tube;

said tube having a peripheral wall, the peripheral wall having a thickness; and said cross-sectional area, said ratio, said thickness and said length being configured to absorb the impact energy of collisions to the door.

19. The reinforcement element according to claim 18, further including means for adding additional strength to at least the central portion of said reinforcement element, said means for adding additional strength comprising at least one of:

a thickening of the wall of the reinforcement element along at least the central portion of said reinforcement element; and a sleeve means fastened to at least one of:

an exterior surface of at least the central portion of said reinforcement element; and an interior surface of at least the central portion of said reinforcement element.

20. The reinforcement element according to claim 19, wherein:

the ratio of the first dimension to the second dimension in the central portion is 1.45;

said oval central portion of said at least one reinforcement element comprises:

a first wall part and a second wall part, said second wall part being disposed spaced apart from said first wall part and each of said first wall part and said second wall part being substantially flat;

a third wall part and a fourth wall part, said third wall part being disposed spaced apart from said fourth wall part;

each of said third wall part and said fourth wall part being disposed between and connecting said first wall part to said second wall part; and said third wall part and said fourth wall part being substantially semi-circular and curved outwardly away from each other.

* * * * *